(12) United States Patent
Thomas et al.

(10) Patent No.: US 11,175,918 B2
(45) Date of Patent: Nov. 16, 2021

(54) MANAGEMENT PROTOCOL ADAPTER

(71) Applicant: American Megatrends International, LLC, Duluth, GA (US)

(72) Inventors: Satheesh Thomas, Dunwoody, GA (US); Aruna Venkataraman, Duluth, GA (US); Baskar Parthiban, Johns Creek, GA (US)

(73) Assignee: AMERICAN MEGATRENDS INTERNATIONAL, LLC, Duluth, GA (US)

( * ) Notice: Subject to any disclaimer, the term of this patent is extended or adjusted under 35 U.S.C. 154(b) by 43 days.

(21) Appl. No.: 15/706,927

(22) Filed: Sep. 18, 2017

(65) Prior Publication Data

US 2019/0087182 A1 Mar. 21, 2019

(51) Int. Cl.
*G06F 9/30* (2018.01)
*H04L 12/24* (2006.01)
*H04L 29/06* (2006.01)
*H04L 29/08* (2006.01)

(52) U.S. Cl.
CPC ........ *G06F 9/3017* (2013.01); *H04L 41/0226* (2013.01); *H04L 41/04* (2013.01); *H04L 67/1002* (2013.01); *H04L 69/08* (2013.01)

(58) Field of Classification Search
CPC ... H04L 67/42; H04L 41/0226; H04L 67/303; H04L 69/18; H04L 29/08072; H04L 41/0803; H04L 63/102; H04L 67/104; H04L 65/1073; H04L 29/06027; H04L 69/03; H04L 67/125; H04L 12/2803; H04L 41/22; H04L 69/08; H04L 12/2825; H04L 65/1066; H04L 69/24; H04L 41/04; G06F 9/546; G06F 11/1441; G06F 13/20; G06F 2209/508; G06F 9/3017; H04W 8/005; H04W 76/15; H04W 76/14; H04W 88/02; H04W 76/10; H04W 92/18
USPC ........... 370/401; 709/223, 238; 710/72, 300, 710/310
See application file for complete search history.

(56) References Cited

U.S. PATENT DOCUMENTS

| | | | | |
|---|---|---|---|---|
| 5,818,603 A * | 10/1998 | Motoyama | ......... | H04N 1/00344 358/296 |
| 7,418,513 B2 * | 8/2008 | Chang | .................. | H04L 41/046 709/221 |
| 7,454,517 B2 * | 11/2008 | Ha | ...................... | H04L 12/2825 709/236 |
| 8,001,232 B1 * | 8/2011 | Saulpaugh | .............. | G06F 9/465 709/203 |
| 2005/0002417 A1 * | 1/2005 | Kelly | ..................... | H04L 69/08 370/466 |

(Continued)

*Primary Examiner* — Tonia L Dollinger
*Assistant Examiner* — Linh T. Nguyen
(74) *Attorney, Agent, or Firm* — Locke Lord LLP; Tim Tingkang Xia, Esq.

(57) ABSTRACT

In an aspect of the disclosure, a method, a computer-readable medium, and an apparatus are provided. The apparatus receives first command or data in accordance with a first management protocol from a first device. The apparatus then translates the first command or data into second command or data in accordance with second management protocol. The apparatus further sends the second command or data to a second device. One of the first device and the second device is a first managed element managing a first host.

20 Claims, 5 Drawing Sheets

(56) References Cited

U.S. PATENT DOCUMENTS

| | | | | |
|---|---|---|---|---|
| 2005/0079871 A1* | 4/2005 | Kirk | G06F 19/3418 | 455/446 |
| 2005/0256934 A1* | 11/2005 | Motoyama | H04L 69/18 | 709/208 |
| 2005/0288982 A1* | 12/2005 | Konno | G06Q 30/0623 | 705/26.61 |
| 2006/0259612 A1* | 11/2006 | De Oliveira | H04L 41/0226 | 709/224 |
| 2007/0027981 A1* | 2/2007 | Coglitore | H04L 43/0817 | 709/224 |
| 2007/0033438 A1* | 2/2007 | Hsieh | G06F 11/00 | 714/24 |
| 2009/0067408 A1* | 3/2009 | Leppainen | H04L 65/1073 | 370/350 |
| 2012/0254453 A1* | 10/2012 | Lejeune | H04L 67/08 | 709/230 |
| 2013/0173810 A1* | 7/2013 | Subramaniam | G06F 15/161 | 709/227 |
| 2013/0346551 A1* | 12/2013 | Roshen | G06F 9/5055 | 709/217 |
| 2014/0129687 A1* | 5/2014 | Halpern | H04L 45/02 | 709/221 |
| 2014/0344430 A1* | 11/2014 | Ayanam | H04L 41/0213 | 709/223 |
| 2015/0304171 A1* | 10/2015 | Kim | G06F 3/0482 | 715/733 |
| 2016/0021207 A1* | 1/2016 | Dingwall | H04L 67/2814 | 709/203 |
| 2017/0185383 A1* | 6/2017 | Sarkar | G06F 3/04842 | |
| 2017/0223147 A1* | 8/2017 | Wang | H04L 69/161 | |
| 2017/0353354 A1* | 12/2017 | Karapantelakis | H04W 76/14 | |
| 2017/0371756 A1* | 12/2017 | Hanson | G06F 11/3013 | |
| 2018/0077516 A1* | 3/2018 | Viswanathan | H04W 4/50 | |
| 2018/0212999 A1* | 7/2018 | Kassimis | H04L 63/20 | |
| 2019/0004901 A1* | 1/2019 | Ryan | G06F 11/1441 | |
| 2019/0026125 A1* | 1/2019 | Preimesberger | G06F 8/65 | |
| 2019/0387458 A1* | 12/2019 | Li | H04W 4/70 | |

\* cited by examiner

MANAGEMENT PROTOCOL ADAPTER

BACKGROUND

Field

The present disclosure relates generally to computer systems, and more particularly, to a module that can dynamically translate or convert commands and/or data of one management protocol to commands and/or data of another management protocol.

Background

The statements in this section merely provide background information related to the present disclosure and may not constitute prior art.

Considerable developments have been made in the arena of server management. An industry standard called Intelligent Platform Management Interface (IPMI), described in, e.g., "IPMI: Intelligent Platform Management Interface Specification, Second Generation," v.2.0, Feb. 12, 2004, defines a protocol, requirements and guidelines for implementing a management solution for server-class computer systems. The features provided by the IPMI standard include power management, system event logging, environmental health monitoring using various sensors, watchdog timers, field replaceable unit information, in-band and out of band access to the management controller, SNMP traps, etc.

A component that is normally included in a server-class computer to implement the IPMI standard is known as a Baseboard Management Controller (BMC). A BMC is a specialized microcontroller embedded on the motherboard of the computer, which manages the interface between the system management software and the platform hardware. The BMC generally provides the "intelligence" in the IPMI architecture.

The BMC may be considered as an embedded-system device or a service processor. A BMC may require a firmware image to make them operational. "Firmware" is software that is stored in a read-only memory (ROM) (which may be reprogrammable), such as a ROM, programmable read-only memory (PROM), erasable programmable read-only memory (EPROM), electrically erasable programmable read-only memory (EEPROM), etc.

The management protocols evolve over time and in some case replaces existing management protocols. Replacing all implementations are costly. Also, newer management protocols may need newer hardware. Therefore, there is a need for a mechanism that can dynamically translate or convert commands and/or data of one management protocol to commands and/or data of another management protocol.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus receives first command or data in accordance with a first management protocol from a first device. The apparatus then translates the first command or data into second command or data in accordance with second management protocol. The apparatus further sends the second command or data to a second device. One of the first device and the second device is a first managed element managing a first host.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
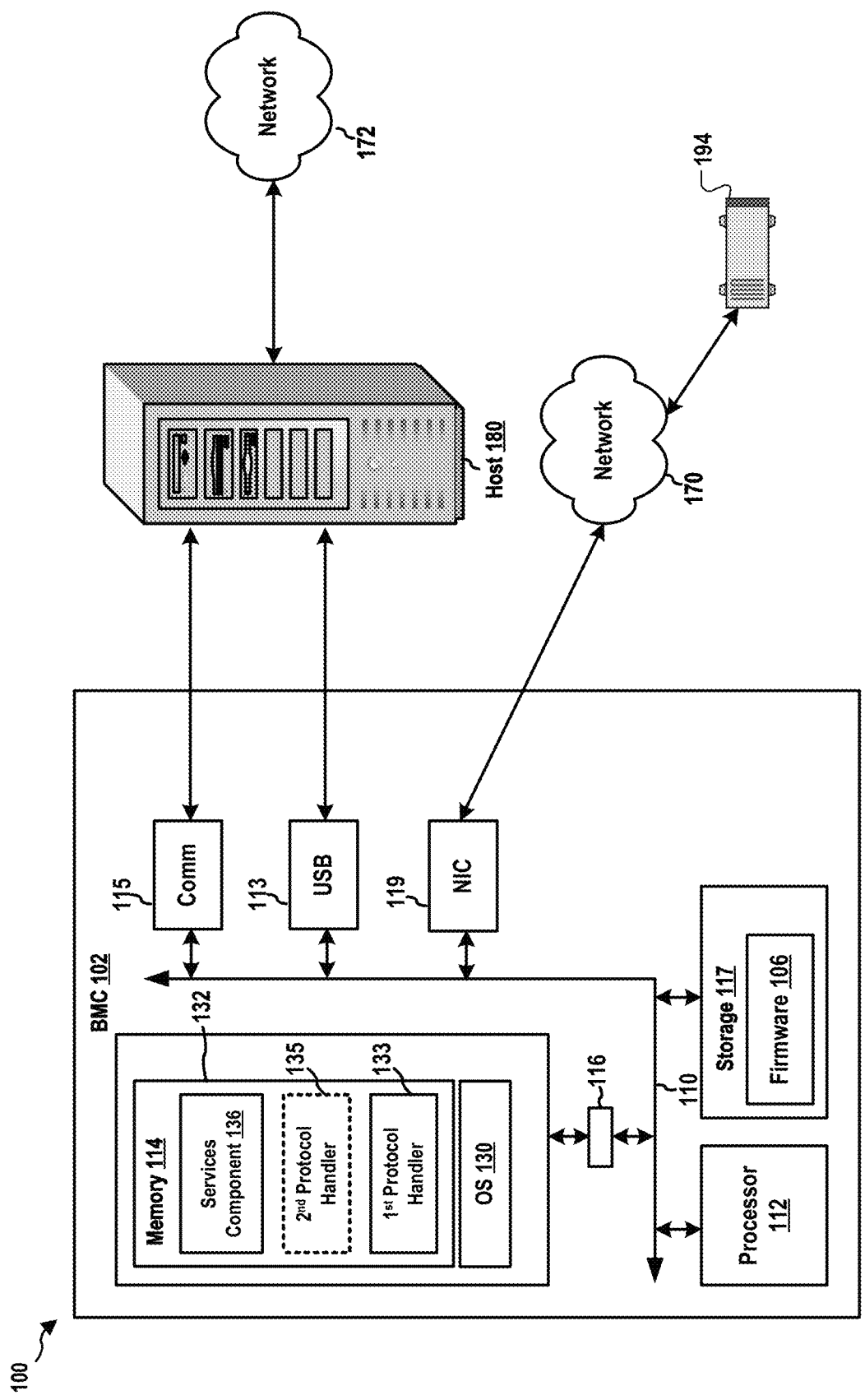
FIG. 1 is a diagram illustrating a computer system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of computer systems will now be presented with reference to various apparatus and methods. These apparatus and methods will be described in the following detailed description and illustrated in the accompanying drawings by various blocks, components, circuits, processes, algorithms, etc. (collectively referred to as elements). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a processing system that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram 100 illustrating a computer system. In this example, the computer system includes, among other devices, a BMC 102 and a host computer 180. The BMC 102 has, among other components, a processing unit 112, a memory 114, a memory driver 116, a storage 117, a network interface card 119, a USB interface 113 (Universal Serial Bus), and other communication interfaces 115.

The communication interfaces 115 may include a keyboard controller style (KCS), a server management interface chip (SMIC), a block transfer (BT) interface, a system management bus system interface (SSIF), and/or other suitable communication interface(s). Further, the BMC 102 supports IPMI and provides an IPMI interface between the BMC 102 and the host computer 180. The IPMI interface may be implemented over one or more of the USB interface 113, the network interface card 119, and the communication interfaces 115.

In certain configurations, one or more of the above components may be implemented as a system-on-a-chip (SoC). For examples, the processing unit 112, the memory 114, the memory driver 116, the storage 117, the network interface card 119, the USB interface 113, and/or the communication interfaces 115 may be on the same chip. In addition, the memory 114, the processing unit 112, the memory driver 116, the storage 117, the communication interfaces 115, and/or the network interface card 119 may be in communication with each other through a communication channel 110 such as a bus architecture.

The BMC 102 may store BMC firmware 106 in the storage 117. The storage 117 may utilize a non-volatile, non-transitory storage media. When the processing unit 112 executes the BMC firmware 106, the processing unit 112 loads code and data of the BMC firmware 106 into the memory 114. In particular, the BMC firmware 106 can provide in the memory 114 an OS 130 (operating system) and programs 132. The programs 132 includes, among other components, a first management-protocol handler 133 and service components 136. The programs 132 may optionally include a second management-protocol handler 135 and more handlers supports additional management protocols. The programs 132 may also include other service management components such as IPMI components. Further, the programs 132 may be implemented as a service stack. As such, the BMC firmware 106 provides an embedded system to the BMC 102.

The BMC 102 may be in communication with the host computer 180 through the USB interface 113, the network interface card 119, the communication interfaces 115, and/or the IPMI interface. The host computer 180 includes various components including one or more host services. The service stack of the BMC 102 may manage the host computer 180 and is responsible for managing and monitoring the server vitals such as temperature and voltage levels. The service stack can also facilitate administrators to remotely access and manage the host computer 180. In particular, the BMC 102 may manage the host computer 180 in accordance with IPMI. The programs 132 may receive and send IPMI messages to the host computer 180 through the IPMI interface.

Further, the host computer 180 may be connected to a communication network 172. In one example, the host computer 180 may be a computer system in a data center. Through the communication network 172, the host computer 180 may exchange data with other computer systems in the data center or exchange data with machines on the Internet.

The BMC 102 may be in communication with a management network 170 (e.g., a local area network (LAN)). In this example, the BMC 102 may be in communication with the management network 170 through the network interface card 119. Further, the management network 170 may be isolated from the communication network 172 and out-of-band to the communication network 172. In certain configurations, the management network 170 may not be connected to the Internet. In certain configurations, the management network 170 may be in communication with the communication network 172 and/or the Internet. In addition, through the management network 170, a remote device 194 may communicate with the BMC 102. For example, the remote device 194 may send IPMI messages to the BMC 102 over the management network 170.

In this example, the first management-protocol handler 133 supports IPMI management protocol, which is a legacy management protocol. In other example, the first management-protocol handler 133 and, if provided, the second management-protocol handler 135 may supports other management protocol and, in particular, legacy management protocols. More specifically, the first management-protocol handler 133 can receive an IPMI message (e.g., from the remote device 194) and can parse the IPMI message to obtain command or data contained in the IPMI message. The first management-protocol handler 133 then sends the command or data to the appropriate ones of the service components 136 for further handling. For example, the IPMI message received by the first management-protocol handler 133 may include a command to fetch a particular sensor reading. The first management-protocol handler 133, after obtaining the command form the message, sends the command to a sensor data record (SDR) component of the service components 136. The SDR component locates the sensor reading and returns it to the first management-protocol handler 133.

Figure 2:
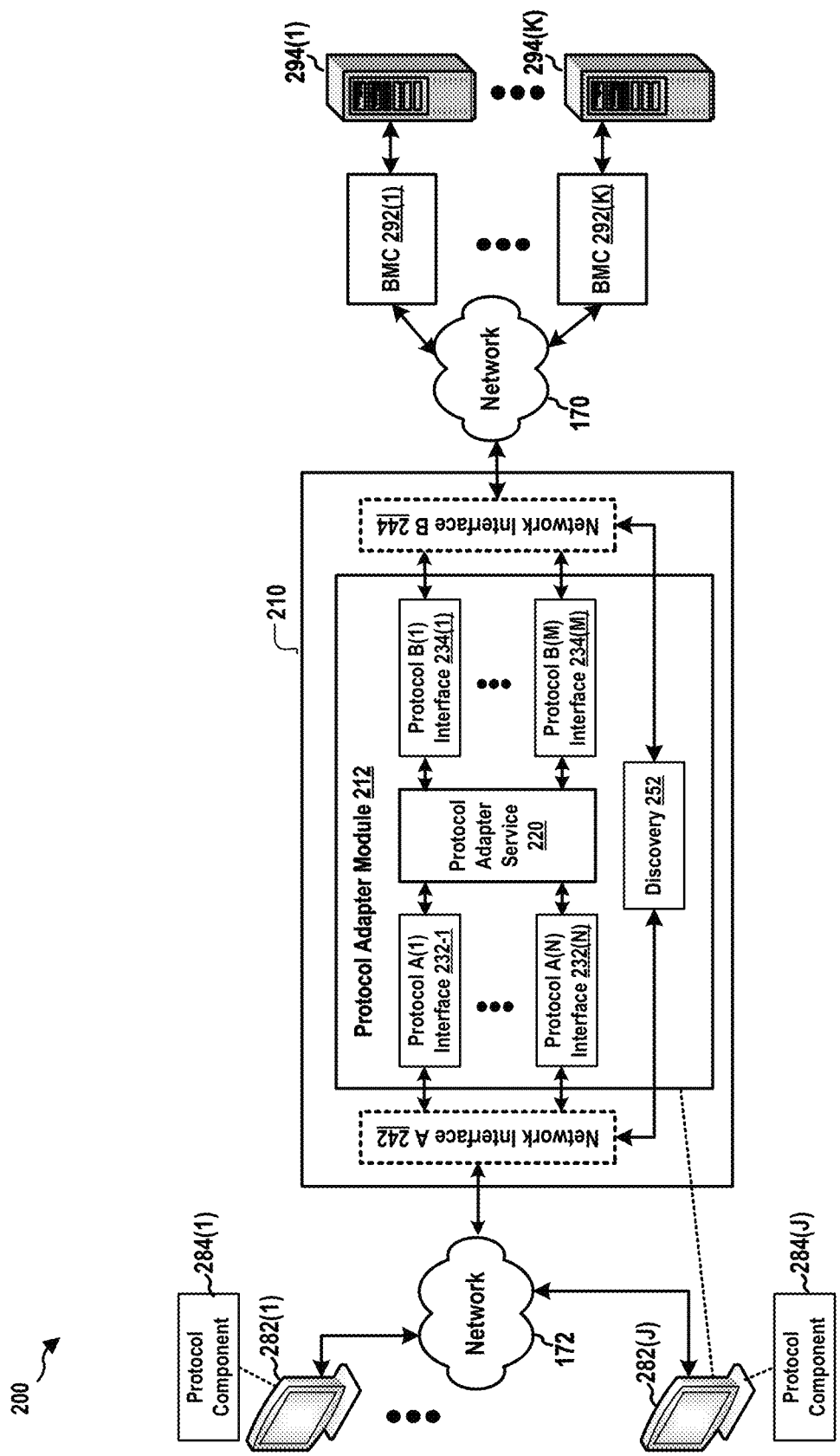
FIG. 2 is a diagram illustrating a module that can facilitate communications between a management console and a managed element.

FIG. 2 is a diagram 200 illustrating a management-protocol-adapter module 212 that can facilitate communications between a management console and a managed element. As described infra, the management-protocol-adapter module 212 can function as an interfacing layer that allows communication between management consoles and managed elements. The interfacing layer can be software/ firmware layer on an existing system or a dedicated system. Further, a single adapter can serve the needs for managing multiple managed elements.

More specifically, the management-protocol-adapter module 212 includes a management-protocol-adapter service 220, a discovery component 252, management-protocols A(1)-A(N) interfaces 232(1)-232(N) for communication in accordance with management protocols A(1)-A(N), respectively, and management-protocols B(1)-B(M) interfaces 234(1)-234(M) for communication in accordance with management protocols B(1)-B(M), respectively. As described infra, the management-protocol-adapter module 212 supports management protocols A(1)-A(N) and management protocols B(1)-B(M), and can translate or convert commands and/or data of one management protocol to commands and/or data of another management protocol.

For example, the management protocols A(1)-A(N) may include REDFISH protocol, WS-Management Protocol, etc. The management protocols B(1)-B(M) may include legacy management protocols such as IPMI. The REDFISH protocol is defined in "Redfish Scalable Platforms Management API Specification, Document Identifier: DSP0266, Date: 2017-05-21 Version: 1.2.0," which is published by DISTRIBUTED MANAGEMENT TASK FORCE, INC. and is herein expressively incorporated by reference in its entirety. The WS-Management Protocol is defined in "Web Services for Management (WS-Management) Specification, Document Identifier: DSP0226, Date: 2014-09-30, Version: 1.2.0," which is published by DISTRIBUTED MANAGEMENT TASK FORCE, INC. and is herein expressively incorporated by reference in its entirety.

Further, as shown, the BMCs 292(1)-292(K) manage hosts 294(1)-294(K), respectively. Each of the BMCs 292(1)-292(K) is considered as a managed element and includes at least a first management-protocol handler 133 (as described supra) supporting one or more of the management protocols B(1)-B(M). Each pair of BMC and host from the BMCs 292(1)-292(K) and the hosts 294(1)-294(K) may be the same as the pair of the BMC 102 and the host computer 180 described supra referring FIG. 1.

Management consoles 282(1)-282(J) are devices that each provide a user interface or an Application program interface (API) through which a user or another device manage one or more management elements. In this example, the management consoles 282(1)-282(J) may wish to communicate with the BMCs 292(1)-292(K) and send commands and/or data to the BMCs 292(1)-292(K) for managing the hosts 294(1)-294(K). The management consoles 282(1)-282(J) include management-protocol components 284(1)-284(J), respectively, each of which supports one or more of the management protocols A(1)-A(N). Further, a given one of the management consoles 282(1)-282(J) and a given one of the BMCs 292(1)-292(K) may not support a common management protocol. In this situation, the given one of the management consoles 282(1)-282(J) cannot communicate commands and/or data directly with the given one of the BMCs 292(1)-292(K).

The discovery component 252 can discover identities and capacities of BMCs and other management elements in a network in accordance with discover protocols such as Service Location Protocol (SLP). In this example, the discovery component 252 discovers the BMCs 292(1)-292(K) and may store the identifies (e.g., device names, IP addresses) and the capacities (e.g., management protocols supported, hosts managed) of the BMCs 292(1)-292(K) locally at the discovery component 252. Subsequently, the discovery component 252 may publish the identities and capabilities of the BMCs 292(1)-292(K) in one or more networks. In addition, the management-protocol-adapter service 220 publishes, in the communication network 172, identifies (e.g., name and version of each management protocol) of the management protocols A(1)-A(N) and indications that a user may choose any of the management protocols A(1)-A(N) to manage any of the BMCs 292(1)-292(K).

In a first scenario, the BMCs 292(1)-292(K) may be in the management network 170, which is an internal network (e.g., a private network). On the other hand, the management consoles 282(1)-282(J) are in the communication network 172, which is an external network (e.g., a public network, Internet). As such, the management consoles 282(1)-282(J) in the communication network 172 may not be able to communicate with the BMCs 292(1)-292(K) in the management network 170 directly.

In a first configuration, the management-protocol-adapter module 212 is a part of an adapter device 210. The adapter device 210 may also include a network interface A 242 and a network interface B 244. The network interface A 242 is configured to provide access to the communication network 172, while the network interface B 244 is configured to provide access to the management network 170. As such, the management-protocol-adapter module 212 can discover and communicate with the BMCs 292(1)-292(K) in the management network 170 through the network interface B 244. The management-protocol-adapter module 212 can discover and communicate with the management consoles 282(1)-282(J) in the communication network 172 through the network interface A 242.

Subsequently, as an example, the management console 282(1) may discover the management-protocol-adapter module 212 as well as the identities of the management protocols A(1)-A(N) and the identities and capabilities of the BMCs 292(1)-292(K) published by the management-protocol-adapter module 212. The management console 282(1) may choose to send command or data directed to the BMC 292(1) to the management-protocol-adapter module 212 in accordance with management-protocol A(1) (e.g., REDFISH protocol). The management-protocol-adapter module 212 receives the command or data through the management-protocol-A(1) interface 232(1). The management-protocol-adapter module 212 processes the command or data in accordance with the management-protocol A(1). Based on the indication included in the command or data, the management-protocol-adapter module 212 can determine that the command or data is directed to the BMC 292(1).

Based on the capacities of the BMC 292(1) already discovered by the management-protocol-adapter module 212, the management-protocol-adapter module 212 determines that the BMC 292(1) only supports the management-protocol B(1) (e.g., IPMI). Accordingly, the management-protocol-adapter module 212 translates or converts the command or data just received from the management console 282(1) in accordance with the management-protocol A(1) (e.g., REDFISH protocol) to command or data in accordance with the management-protocol B(1) (e.g., IPMI). The management-protocol-adapter service 220 then sends the converted command or data to the BMC 292(1) through the management-protocol-B(1) interface 234(1).

The BMC 292(1) receives the converted command or data in accordance with the management-protocol B(1). The command or data also indicates that the original sender is the management console 282(1). When the command or data requests a response from the BMC 292(1), the BMC 292(1) accordingly prepares the response in accordance with the management-protocol B(1). The response also includes an indication that the response is directed to the original sender (i.e., the management console 282(1) in this example). Subsequently, the BMC 292(1) sends the response to the management-protocol-adapter module 212. The management-protocol-adapter service 220 receives the response through the management-protocol-B(1) interface 234(1). The management-protocol-adapter service 220 parses the response and determines that the response is to be sent to the management console 282(1). The management-protocol-adapter service 220 previously learned that the management console 282(1) supports the management-protocol A(1) but not the management-protocol B(1). Accordingly, the management-protocol-adapter service 220 translates or converts the response of the management-protocol B(1) to a response in compliance with the management-protocol A(1). The management-protocol-adapter service 220 then sends the converted response to the management console 282(1) through the management-protocol-A(1) interface 232(1).

For example, the management console 282(1) may send, to the management-protocol-adapter module 212, a REDFISH protocol command for getting a CPU temperature sensor reading from the BMC 292(1). Accordingly, the management-protocol-adapter service 220 receives the REDFISH protocol command through the management-protocol-A(1) interface 232(1). The management-protocol-adapter service 220 converts the REDFISH protocol command to an IPMI command for getting the same CPU temperature sensor reading from the BMC 292(1). The management-protocol-adapter service 220 then sends the converted IPMI command to the BMC 292(1) through the management-protocol-B(1) interface 234(1). Subsequently, the management-protocol-adapter service 220 receives an IPMI response from the BMC 292(1) through the management-protocol-B(1) interface 234(1). The IPMI response includes the requested CPU temperature sensor reading. The management-protocol-adapter service 220 converts the IPMI response to a REDFISH protocol message, which includes the CPU temperature sensor reading. The management-protocol-adapter service 220 then sends the REDFISH protocol message to the management console 282(1) through the management-protocol-A(1) interface 232(1).

In a second scenario, one or more of the management consoles 282(1)-282(J) may be in the same network with the BMCs 292(1)-292(K). As such, those management consoles may communicate with the management consoles 282(1)-282(J) directly. In a second configuration, the management-protocol-adapter module 212 may be on the same device of a management console. More specifically, as an example, the management console 282(J) is in the same network (e.g., the management network 170) with the BMCs 292(1)-292(K). The management console 282(J) may be provided with a management-protocol-adapter module 212. The management-protocol component 284(J) of the management console 282(J) is in communication with the management-protocol-adapter module 212 on the same device.

Similarly to what was described supra, the management-protocol component 284(J) can send command or data, which are directed to the BMC 292(K), in accordance with the management-protocol A(2) (e.g., WS-Management Protocol) to the management-protocol-adapter service 220. The management-protocol-adapter service 220 receives the command or data through the management-protocol-A(2) interface 232(2). The management-protocol-adapter service 220 determines that the BMC 292(K) also supports the management-protocol B(1) (e.g., IPMI). Accordingly, the management-protocol-adapter service 220 translates or converts the command or data received in accordance with management-protocol A(2) to command or data in accordance with the management-protocol B(1). Then, the management-protocol-adapter service 220 sends the converted command or data to the BMC 292(K) through the management-protocol-B(1) interface 234(1).

In addition, multiple adapter devices 210 can be employed in parallel to server a large number of BMCs in a network. If one of the adapter devices 210 fails, the failed adapter device 210 can be replaced by another adapter device 210 without affecting the other elements in the network.

Figure 3:
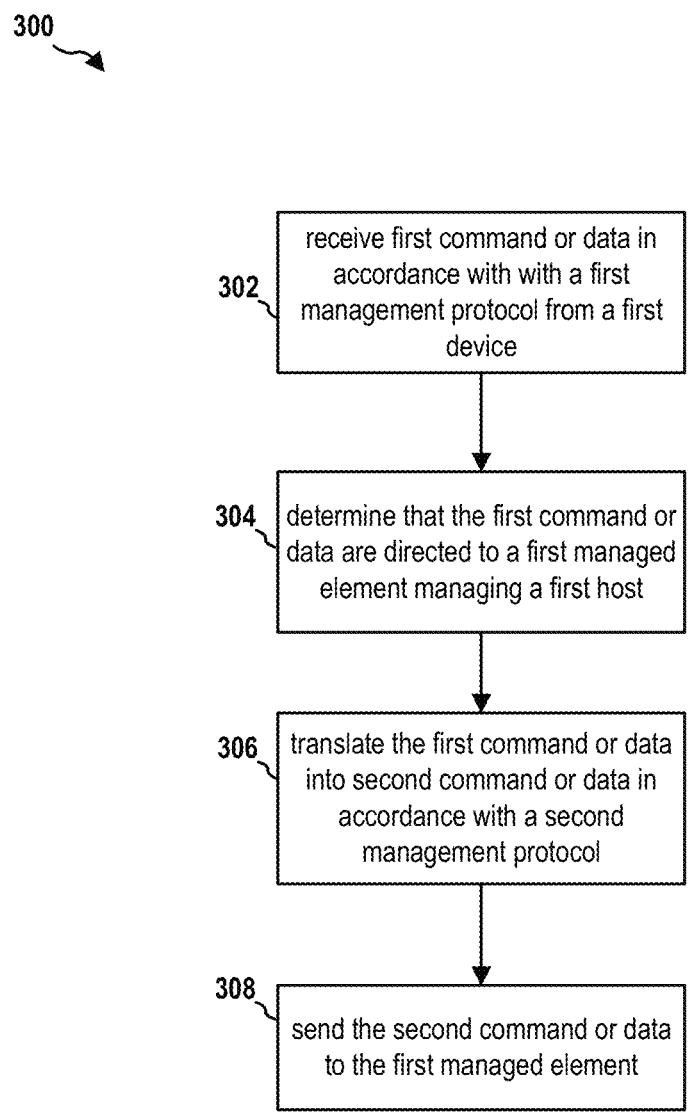
FIG. 3 is a flow chart of a method (process) for communicating with one or more management elements.

FIG. 3 is a flow chart 300 of a method (process) for communicating with one or more management elements. The method may be performed by a module (e.g., the management-protocol-adapter module 212, the adapter device 210, the apparatus 212'). At operation 302, the module receives first command or data in accordance with a first management protocol (e.g., management-protocol A(1), REDFISH protocol) from a first device (e.g., management console 282(1)). At operation 304, the module determines that the first command or data are directed to a first managed element (e.g., the BMC 102, the BMC 292(1)) managing a first host (the host computer 180, the host 294(1)). At operation 306, the module translates the first command or data into second command or data in accordance with second management protocol (e.g., the management-protocol B(1), IPMI). At operation 308, the module sends the second command or data to the first managed element.

In certain configurations, the first managed element does not support the first management protocol. In certain configurations, the one or more management elements includes a plurality of management elements. In certain configurations, the module receives third command or data in accordance with one management protocol of a first plurality of management protocols a third device. In certain configurations, the one management protocol of the first plurality of management protocols is different from the first management protocol.

The module translates the third command or data into fourth command or data in accordance with one management protocol of a second plurality of management protocols supported by the one or more management elements. The module sends the fourth second command or data to a fourth device. In certain configurations, one of the third device and the fourth device is a second managed element of the one or more management elements and managing a second host.

In certain configurations, the one management protocol of the second plurality of management protocols is different from the second management protocol. In certain configurations, the first command or data are received through an external network. In certain configurations, the second command or data are sent through an internal network.

Figure 4:
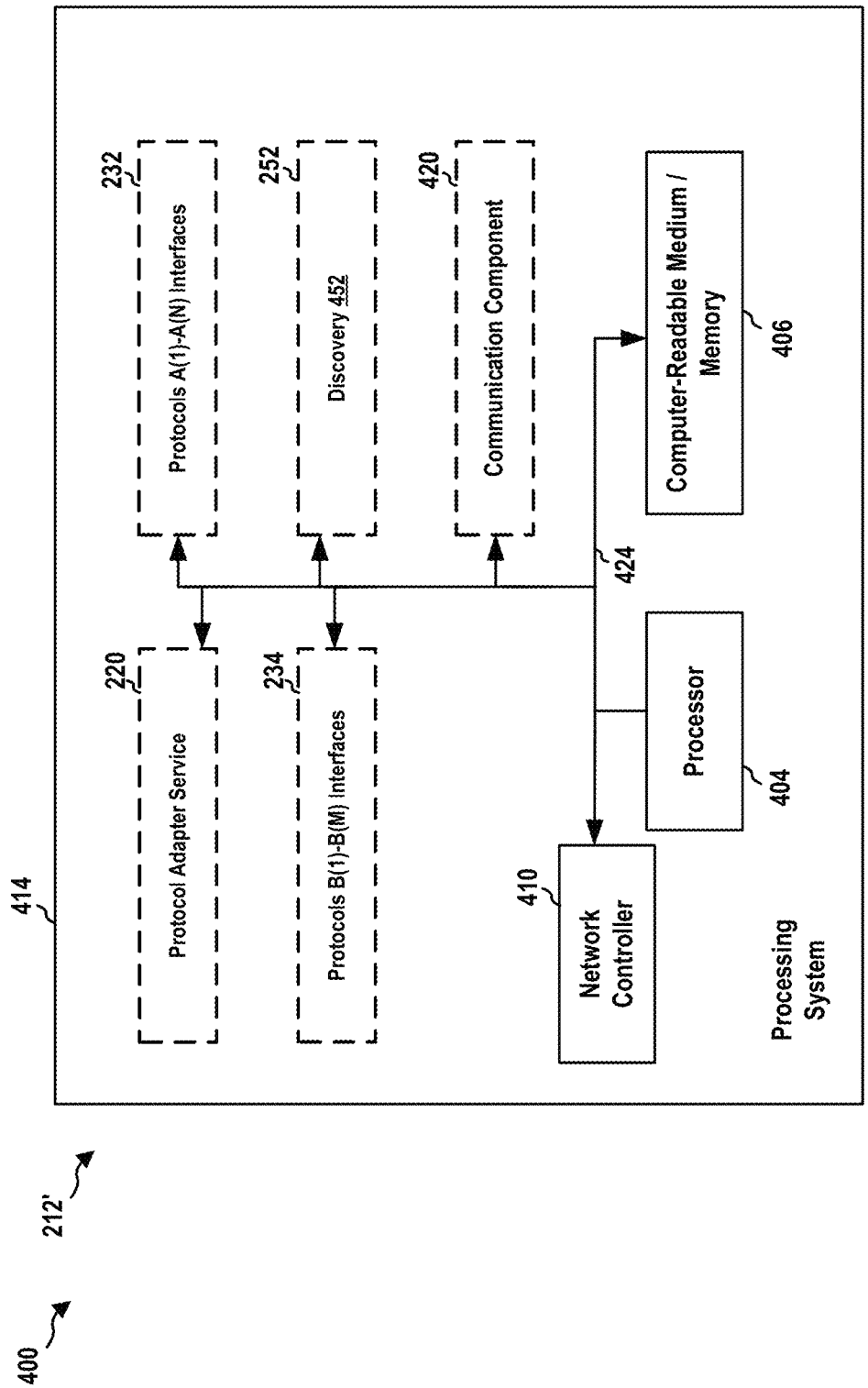
FIG. 4 is a diagram illustrating an example of a hardware implementation for an apparatus employing a processing system.

FIG. 4 is a diagram 400 illustrating an example of a hardware implementation for an apparatus 202' employing a processing system 414. The apparatus 212' may implement the management-protocol-adapter module 212. The processing system 414 may be implemented with a bus architecture, represented generally by the bus 424 The bus 424 may include any number of interconnecting buses and bridges depending on the specific application of the processing system 414 and the overall design constraints. The bus 424 links together various circuits including one or more processors and/or hardware components, represented by the processor 404, the computer-readable medium/memory 406, a network controller 410, etc.

The computer-readable medium/memory 406 may include the memory 114 and/or the storage 117 The bus 424 may also link various other circuits such as timing sources, peripherals, voltage regulators, and power management circuits, which are well known in the art, and therefore, will not be described any further.

The processing system 414 may be coupled to the network controller 410. The network controller 410 provides a means for communicating with various other apparatus over a network. The network controller 410 receives a signal from the network, extracts information from the received signal, and provides the extracted information to the processing system 414, specifically a communication component 420 of the apparatus 212'. In addition, the network controller 410 receives information from the processing system 414, specifically the communication component 420, and based on the received information, generates a signal to be sent to the network. The processing system 414 includes a processor 404 coupled to a computer-readable medium/memory 406. The processor 404 is responsible for general processing, including the execution of software stored on the computer-readable medium/memory 406. The software, when executed by the processor 404, causes the processing system 414 to perform the various functions described supra for any particular apparatus. The computer-readable medium/memory 406 may also be used for storing data that is manipulated by the processor 404 when executing software. The processing system further includes at least one of the management-protocol-adapter service 220, the management-protocols A(1)-A(N) interfaces 232(1)-232(N), the management-protocols B(1)-B(M) interfaces 234(1)-234(M), and the discovery component 252. The components may be software components running in the processor 404, resident/stored in the computer readable medium/memory 406, one or more hardware components coupled to the processor 404, or some combination thereof.

The apparatus 212' may be configured to include means for performing operations described supra referring to FIG. 3. The aforementioned means may be one or more of the aforementioned components of the apparatus 212 and/or the processing system 414 of the apparatus 212' configured to perform the functions recited by the aforementioned means.

Figure 5:
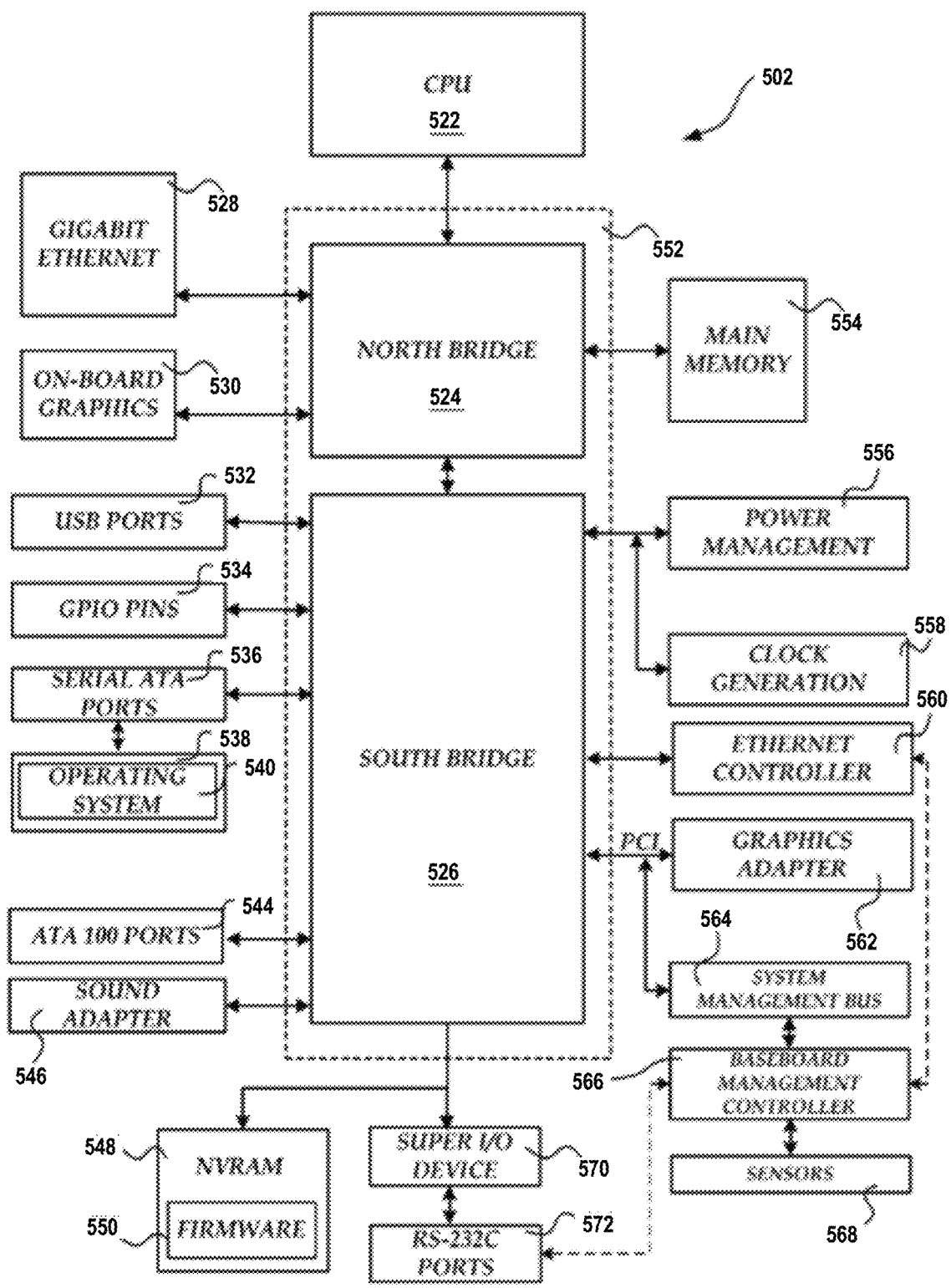
FIG. 5 shows a computer architecture for a computer.

FIG. 5 and the following discussion are intended to provide a brief, general description of one suitable computing environment in which aspects of the embodiments described herein may be implemented. In particular, FIG. 5 shows a computer architecture for a computer 502 that may be utilized to embody the host computer 180, as described supra. It should be appreciated that the computer architecture shown in FIG. 5 is merely illustrative and that other types of computers and computing devices may also be utilized to implement aspects of the embodiments presented herein.

While aspects presented herein include computer programs that execute in conjunction with the execution of an operating system, those skilled in the art will recognize that the embodiments may also be implemented in combination with other program modules and/or hardware devices. As described herein, computer programs include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

The computer 502 shown in FIG. 5 includes a baseboard, or "motherboard," which is a printed circuit board to which a multitude of components or devices may be connected by way of a system bus or other electrical communication path. In one illustrative embodiment, a CPU 522 operates in conjunction with a chipset 552. The CPU 522 is a standard central processor that performs arithmetic and logical operations necessary for the operation of the computer. The server computer 502 may include a multitude of CPUs 522.

The chipset 552 includes a north bridge 524 and a south bridge 526. The north bridge 524 provides an interface between the CPU 522 and the remainder of the computer 502. The north bridge 524 also provides an interface to a random access memory ("RAM") used as the main memory 554 in the computer 502 and, possibly, to an on-board graphics adapter 530. The north bridge 524 may also include functionality for providing networking functionality through a gigabit Ethernet adapter 528. The gigabit Ethernet adapter 528 is capable of connecting the computer 502 to another computer via a network. Connections which may be made by the network adapter 528 may include LAN or WAN connections. LAN and WAN networking environments are commonplace in offices, enterprise-wide computer networks, intranets, and the internet. The north bridge 524 is connected to the south bridge 526.

The south bridge 526 is responsible for controlling many of the input/output functions of the computer 502. In particular, the south bridge 526 may provide one or more USB ports 532, a sound adapter 546, an Ethernet controller 560, and one or more GPIO pins 534. The south bridge 526 may also provide a bus for interfacing peripheral card devices such as a graphics adapter 562. In one embodiment, the bus comprises a PCI bus. The south bridge 526 may also provide a system management bus 564 for use in managing the various components of the computer 502. Additional details regarding the operation of the system management bus 564 and its connected components are provided below.

The south bridge 526 is also operative to provide one or more interfaces for connecting mass storage devices to the computer 502. For instance, according to an embodiment, the south bridge 526 includes a serial advanced technology attachment ("SATA") adapter for providing one or more SATA ports 536 and an ATA 100 adapter for providing one or more ATA 100 ports 544. The SATA ports 536 and the ATA 100 ports 544 may be, in turn, connected to one or more mass storage devices such as the SATA disk drive 538 storing an operating system 540 and application programs.

As known to those skilled in the art, an operating system 540 comprises a set of programs that control operations of a computer and allocation of resources. An application program is software that runs on top of the operating system software, or other runtime environment, and uses computer resources to perform application specific tasks desired by the user. According to one embodiment of the invention, the operating system 540 comprises the LINUX operating system. According to another embodiment of the invention the operating system 540 comprises an operating system within the WINDOWS family of operating systems from MICROSOFT CORPORATION. According to another embodiment, the operating system 540 comprises the UNIX, LINUX, or SOLARIS operating system. It should be appreciated that other operating systems may also be utilized.

The mass storage devices connected to the south bridge 526, and their associated computer storage media, provide non-volatile storage for the computer 502. Although the description of computer storage media contained herein refers to a mass storage device, such as a hard disk or CD-ROM drive, it should be appreciated by those skilled in the art that computer storage media can be any available media that can be accessed by the computer 502.

By way of example, and not limitation, computer storage media may comprise volatile and non-volatile, removable and non-removable media implemented in any method or technology for storage of information such as computer-readable instructions, data structures, program modules or other data. Computer storage media also includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

According to embodiments, a low pin count ("LPC") interface may also be provided by the south bridge 526 for connecting a "Super I/O" device 570. The Super I/O device 570 is responsible for providing a number of input/output ports, including a keyboard port, a mouse port, a serial interface 572, a parallel port, and other types of input/output ports. The LPC interface may also connect a computer storage media such as a ROM or a flash memory such as a NVRAM 548 for storing the firmware 550 that includes program code containing the basic routines that help to start up the computer 502 and to transfer information between elements within the computer 502.

As described briefly above, the south bridge 526 may include a system management bus 564. The system management bus 564 may include a BMC 566. The BMC 566 may be the BMC 102. In general, the BMC 566 is a microcontroller that monitors operation of the computer system 502. In a more specific embodiment, the BMC 566 monitors health-related aspects associated with the computer system 502, such as, but not limited to, the temperature of one or more components of the computer system 502, speed of rotational components (e.g., spindle motor, CPU Fan, etc.) within the system, the voltage across or applied to one or more components within the system 502, and the available or used capacity of memory devices within the system 502. To accomplish these monitoring functions, the BMC 566 is communicatively connected to one or more components by way of the management bus 564. In an embodiment, these components include sensor devices 568 for measuring various operating and performance-related parameters within the computer system 502. The sensor devices 568 may be either hardware or software based components configured or programmed to measure or detect one or more of the various operating and performance-related parameters.

It should also be appreciated that the computer 502 may comprise other types of computing devices, including handheld computers, embedded computer systems, personal digital assistants, and other types of computing devices known to those skilled in the art. It is also contemplated that the computer 502 may not include all of the components shown in FIG. 5, may include other components that are not explicitly shown in FIG. 5, or may utilize an architecture completely different than that shown in FIG. 5.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of communicating with one or more management elements, comprising:
   discovering, at a manager component and in accordance with a discovery protocol, respective one or more management protocols supported by each of the one or more management elements;
   publishing, at the manager component and over a network to other networked devices, a name and a version of each management protocol of a set of management protocols supported by the manager component for communicating with the one or more management elements, each protocol of the set of the management protocols providing an application programming interface (API) for managing a service;
   receiving first command or data in accordance with a first management protocol from a first device that is a management console client device with a user interface, the first management protocol being in the set of published management protocols;

translating the first command or data into second command or data in accordance with a second management protocol providing an application programming interface (API) for managing a service, wherein one of the first management protocol and the second management protocol is in compliance with Intelligent Platform Management Interface (IPMI) standards; and sending the second command or data to a second device, wherein one of the first device and the second device is a first managed element managing a first host.

2. The method of claim 1, wherein the second device is the first managed element, wherein the first managed element does not support the first management protocol.

3. The method of claim 2, wherein the one or more management elements includes a plurality of management elements, the method further comprising:

determining that the first command or data are directed to the first managed element among the plurality of management elements, wherein the second command or data are sent to the first managed element in response to the determination.

4. The method of claim 2, further comprising:

receiving third command or data in accordance with one management protocol of a first plurality of management protocols from a third device, wherein the one management protocol of the first plurality of management protocols is different from the first management protocol;

translating the third command or data into fourth command or data in accordance with one management protocol of a second plurality of management protocols supported by the one or more management elements; and sending the fourth second command or data to a fourth device, wherein one of the third device and the fourth device is a second managed element of the one or more management elements and managing a second host.

5. The method of claim 4, wherein the one management protocol of the second plurality of management protocols is different from the second management protocol.

6. The method of claim 2, wherein the first command or data are received through an external network, wherein the second command or data are sent through an internal network.

7. The method of claim 2, wherein the receiving, translating, and sending are performed on the first device.

8. The method of claim 1, wherein the receiving, translating, and sending are performed on a device that is remote from the first device and the second device.

9. An apparatus for communicating with one or more management elements, comprising:

a memory; and at least one processor coupled to the memory and configured to:

discover, at a manager component and in accordance with a discovery protocol, respective one or more management protocols supported by each of the one or more management elements;

publish, at the manager component and over a network to other networked devices, a name and a version of each management protocol of a set of management protocols supported by the manager component for communicating with the one or more management elements, each protocol of the set of the management protocols providing an application programming interface (API) for managing a service;

receive first command or data in accordance with a first management protocol from a first device that is a management console client device with a user interface, the first management protocol being in the set of published management protocols;

translate the first command or data into second command or data in accordance with second management protocol providing an application programming interface (API) for managing a service, wherein one of the first management protocol and the second management protocol is in compliance with Intelligent Platform Management Interface (IPMI) standards; and send the second command or data to a second device, wherein one of the first device and the second device is a first managed element managing a first host.

10. The apparatus of claim 9, wherein the second device is the first managed element, wherein the first managed element does not support the first management protocol.

11. The apparatus of claim 10, wherein the one or more management elements includes a plurality of management elements, wherein the at least one processor is further configured to:

determine that the first command or data are directed to the first managed element among the plurality of management elements, wherein the second command or data are sent to the first managed element in response to the determination.

12. The apparatus of claim 10, wherein the at least one processor is further configured to:

receive third command or data in accordance with one management protocol of a first plurality of management protocols from a third device, wherein the one management protocol of the first plurality of management protocols is different from the first management protocol;

translate the third command or data into fourth command or data in accordance with one management protocol of a second plurality of management protocols supported by the one or more management elements; and send the fourth second command or data to a fourth device, wherein one of the third device and the fourth device is a second managed element of the one or more management elements and managing a second host.

13. The apparatus of claim 12, wherein the one management protocol of the second plurality of management protocols is different from the second management protocol.

14. The apparatus of claim 10, wherein the first command or data are received through an external network, wherein the second command or data are sent through an internal network.

15. A non-transitory computer-readable medium storing computer executable code for operating a service processor, comprising code to:

discover, at a manager component and in accordance with a discovery protocol, respective one or more management protocols supported by each of the one or more management elements;

publish, at the manager component and over a network to other networked devices, a name and a version of each management protocol of a set of management protocols supported by the manager component for communicating with the one or more management elements, each protocol of the set of the management protocols providing an application programming interface (API) for managing a service;

receive first command or data in accordance with a first management protocol from a first device that is a management console client device with a user interface, the first management protocol being in the set of published management protocols;

translate the first command or data into second command or data in accordance with second management protocol providing an application programming interface (API) for managing a service, wherein one of the first management protocol and the second management protocol is in compliance with Intelligent Platform Management Interface (IPMI) standards; and send the second command or data to a second device, wherein one of the first device and the second device is a first managed element managing a first host.

16. The non-transitory computer-readable medium of claim 15, wherein the second device is the first managed element, wherein the first managed element does not support the first management protocol.

17. The non-transitory computer-readable medium of claim 16, wherein the one or more management elements includes a plurality of management elements, wherein the code is further configured to:

determine that the first command or data are directed to the first managed element among the plurality of management elements, wherein the second command or data are sent to the first managed element in response to the determination.

18. The non-transitory computer-readable medium of claim 16, wherein the code is further configured to:

receive third command or data in accordance with one management protocol of a first plurality of management protocols a third device, wherein the one management protocol of the first plurality of management protocols is different from the first management protocol;

translate the third command or data into fourth command or data in accordance with one management protocol of a second plurality of management protocols supported by the one or more management elements; and send the fourth second command or data to a fourth device, wherein one of the third device and the fourth device is a second managed element of the one or more management elements and managing a second host.

19. The non-transitory computer-readable medium of claim 18, wherein the one management protocol of the second plurality of management protocols is different from the second management protocol.

20. The non-transitory computer-readable medium of claim 16, wherein the first command or data are received through an external network, wherein the second command or data are sent through an internal network.

* * * * *